United States Patent
Cherryhomes et al.

(10) Patent No.: US 11,922,471 B1
(45) Date of Patent: Mar. 5, 2024

(54) AUTOMATED DATA ROUTING AND COMPARISON SYSTEMS AND METHODS FOR IDENTIFYING AND IMPLEMENTING AN OPTIMAL PRICING MODEL

(71) Applicant: UnitedHealth Group Incorporated, Minnetonka, MN (US)

(72) Inventors: David G. Cherryhomes, Minnetonka, MN (US); James A. Bailey, Savage, MN (US); Robert Baker, Eden Prairie, MN (US); Matthew J. Maurer, Duluth, MN (US); Ry Larrandson, Minneapolis, MN (US); Nick Rooda, Chaska, MN (US); Charles Heinzel, Minneapolis, MN (US)

(73) Assignee: UnitedHealth Group Incorporated, Minnetonka, MN (US)

( * ) Notice: Subject to any disclaimer, the term of this patent is extended or adjusted under 35 U.S.C. 154(b) by 50 days.

(21) Appl. No.: 16/693,592

(22) Filed: Nov. 25, 2019

Related U.S. Application Data

(60) Provisional application No. 62/772,262, filed on Nov. 28, 2018.

(51) Int. Cl.
  *G06Q 30/0283* (2023.01)
  *G06Q 40/08* (2012.01)
(52) U.S. Cl.
  CPC ......... *G06Q 30/0283* (2013.01); *G06Q 40/08* (2013.01)
(58) Field of Classification Search
  CPC ..................... G06Q 30/0283; G06Q 40/08
  USPC ........................ 705/2, 400, 4, 402
  See application file for complete search history.

(56) References Cited

U.S. PATENT DOCUMENTS

| | | | |
|---|---|---|---|
| 7,890,356 B1 * | 2/2011 | Drucker | G06Q 10/10 705/4 |
| 8,073,709 B2 * | 12/2011 | Moreno | G06Q 10/10 705/2 |
| 8,706,524 B2 | 4/2014 | DiPiero et al. | |
| 2005/0222867 A1 * | 10/2005 | Underwood | G16H 10/60 705/2 |
| 2006/0020495 A1 * | 1/2006 | Baker | G06Q 10/10 705/4 |
| 2007/0179813 A1 * | 8/2007 | Darling | G06Q 30/04 705/2 |
| 2009/0094055 A1 | 4/2009 | Gage, Jr. et al. | |
| 2010/0138363 A1 * | 6/2010 | Batterberry | G06Q 10/04 700/297 |

(Continued)

OTHER PUBLICATIONS

Cleverley, William O., Tightrope walk: setting defensible prices: the balance between generating a reasonable ROI and setting reasonable prices is not always easy for hospitals to maintain, Oct. 2004, Healthcare Financial Management Association, 58.10 (Year: 2004).*

*Primary Examiner* — Emmett K. Walsh
*Assistant Examiner* — Michael C Moroney
(74) *Attorney, Agent, or Firm* — Alston & Bird LLP

(57) ABSTRACT

To automate a pricing strategy for an otherwise unpriced service or item, prices may be generated through a plurality of different pricing models, via a pricing engine passing input data to a plurality of discrete pricing models. Those pricing models may pass data back to the pricing engine, which then adjudicates the results of the pricing models to identify a most-relevant pricing model for the particular unpriced service or item.

21 Claims, 10 Drawing Sheets

(56) References Cited

U.S. PATENT DOCUMENTS

| | | | |
|---|---|---|---|
| 2010/0332373 A1* | 12/2010 | Crabtree | G06Q 40/04 709/224 |
| 2011/0071854 A1* | 3/2011 | Medeiros | G06Q 30/06 705/4 |
| 2011/0231028 A1* | 9/2011 | Ozog | H02J 3/008 700/291 |
| 2012/0054119 A1* | 3/2012 | Zecchini | G06Q 30/0206 705/2.7 |
| 2012/0215563 A1 | 8/2012 | Lassen et al. | |
| 2013/0213038 A1* | 8/2013 | Lazaris | G06Q 50/06 60/641.1 |
| 2014/0081652 A1* | 3/2014 | Klindworth | G06Q 10/0635 705/2 |
| 2015/0066686 A1* | 3/2015 | Hoch | G06Q 30/0631 705/4 |
| 2015/0081519 A1 | 3/2015 | Brereton et al. | |
| 2015/0088535 A1 | 3/2015 | Smith et al. | |
| 2016/0223600 A1* | 8/2016 | Wang | G01R 21/133 |
| 2018/0165757 A1* | 6/2018 | Gelber | G06Q 30/08 705/2 |
| 2018/0232832 A1 | 8/2018 | Szczuka | |

* cited by examiner

| 1 Claim Number | 2 Claim Lines Summary | 3 Claim Line Details | 4 CLA | 5 Payment | 6 Pricing Detail | 7 Notes |

*Claim Header*

| | | | |
|---|---|---|---|
| Claim ID | 123456789 | MemberID | 2222333345 | Total Billed Amt | $$$ |
| Claim Number | AB123456789 | Member First Name | John | Total Provider Responsible Amt | $$$ |
| OtherID | 987654 | Member Last Name | Doe | Total Paid Amt | $$$ |
| Claim Type | Professional | Member DOB | 1/3/1941 | Total Benefit Paid Amt | $$$ |
| Claim Status | Reopen | Member Benefit | 555667894 | Total Account Paid Amt | $$$$ |
| Claim Source | Source 1 | Member Group | 12223 | Total CCO Paid Amt | $$$ |
| SubID | 222902461 | Provider ID | SC54879678 | Total External Plan Paid Amt | $ |
| Plan ID | 456789 | Provider Org ID | 500001 | | |
| Claim sub type | DD1 | Due Date | 4/1/2020 | | |
| Event Type | Adjustment | | | | |

| Claim Lin Num | Allowed Amt | Final Price | Total Reduction Amount | Base Price | Parent Line | PSC &CPS Grouper Status | Pricing Method | Pricing Component |
|---|---|---|---|---|---|---|---|---|
| 1 | $$$$ | $$$$ | $$$$ | $$$$ | 1 | Group 1 | Option 1 | Professional |
| 2 | $$$$ | | | | 1 | Group 1 | Option 1 | Professional |
| 3 | $$$$ | | | | 1 | | Option 1 | Professional |
| 4 | $$$$ | | | | 1 | Group 2 | Option 1 | Professional |
| 5 | $$$$ | $$$$ | $$$$ | $$$$ | 5 | Group 2 | Option 1 | PassThru |
| 6 | $$$$ | | | | 5 | Group 2 | Option 1 | PassThru |
| 7 | $$$$ | | | | 5 | Group 2 | Option 1 | PassThru |
| 8 | $$$$ | | | | 5 | Group 2 | Option 1 | PassThru |
| 9 | $$$$ | | | | 5 | Group 2 | Option 1 | PassThru |
| 10 | $$$$ | | | | 5 | Group 2 | Option 1 | PassThru |
| 11 | $$$$ | $$$ | $$$ | $$$ | 0 | Group 3 | Option 1 | Professional |
| 12 | $$$$ | $$$ | $$$ | $$$ | 0 | Group 3 - Grouper 7 | Option 1 | Professional |
| Total | $$$$$$ | $$$$$$ | $$$$$$ | $$$$$$ | | | | |
| | SUM (Allowed Amt) | SUM (Final Price) | SUM (Total Reductions) | SUM (Base Price) | | | | |

FIG. 7B

From FIG. 7A

| claimPricingExternalResponseCode | |
|---|---|
| claimPricingExternalResponseCode | VARCHAR(30) |
| SystemID | BIGINT(19) |
| shortDescription | VARCHAR(50) |
| longDescription | VARCHAR(4000) |
| characteristic12 | VARCHAR(3) |
| characteristic13 | CHAR(10) |
| characteristic14 | CHAR(1) |
| characteristic15 | VARCHAR(10) |
| characteristic16 | VARCHAR(10) |
| characteristic17 | VARCHAR(10) |

AUTOMATED DATA ROUTING AND COMPARISON SYSTEMS AND METHODS FOR IDENTIFYING AND IMPLEMENTING AN OPTIMAL PRICING MODEL

CROSS-REFERENCE TO RELATED APPLICATIONS

This patent application claims priority to U.S. Provisional Patent Appl. Ser. No. 62/772,262, filed Nov. 28, 2018, which is incorporated herein by reference in its entirety.

BACKGROUND

Without a single point of instruction or reference for a system and/or method to identify appropriate data within a data table or to identify an appropriate algorithm or other methodology for generating data for a particular pricing strategy, existing computational systems are generally unsuited for identifying an optimal pricing model without significant administrator intervention. For example, computational data models for generating pricing strategies for particular services performed may be subject to one or more agreements, such as Certificate of Coverage agreements that may have applicability depending on a member's Situs State. However, existing systems may be unsuitable for determining the applicability of one or more of these agreements automatically, at least in part due to differences in data entry of payment claims and differences in structure and/or formatting of claims data necessary to determine whether particular agreement parameters are applicable and/or satisfied. Accordingly, a need exists for systems and methods enabling automated identification and implementation of optimal pricing models for circumstances where products and/or services are provided without an existing reference agreement.

Through applied effort and ingenuity, limitations and problems with existing systems and methods have been addressed through various embodiments as discussed herein.

BRIEF SUMMARY

Various embodiments are directed to systems and methods for identifying and implementing optimal pricing models, at least in part through processes for optimizing data for utilization by each of a plurality of separate pricing models, facilitating communication with one or more external data processing systems, and comparing the results of various pricing models to identify an optimal pricing model for implementation with one or more claims.

Certain embodiments are directed to a computer-implemented method for implementing an adjudicated price for a claim, the method comprising: receiving, via one or more processors, claim data for an unpriced claim; accessing, via the one or more processors and from a memory storage area; a pricing schedule selected based at least in part on the claim data, wherein the pricing schedule identifies a plurality of pricing models; routing, via the one or more processors, at least a portion of the claim data to each of the plurality of pricing models in accordance with a priority order for execution of the pricing models in accordance with the priority order; consolidating, via the one or more processors and in a memory storage area, pricing data generated from each of the plurality of pricing models, wherein the pricing data generated from each of the plurality of pricing models identifies an allowed amount generated for the claim in accordance with the pricing model; adjudicating, via the one or more processors, the allowed amounts generated from each of the plurality of pricing models based at least in part on the claim data and the pricing data to identify a pricing model for generating a price for the unpriced claim; accessing, via the one or more processors and from the memory storage area, an accumulator table identifying one or more adjustments corresponding to at least a portion of the claim data; and adjusting, via the one or more processors, the pricing data of the identified pricing model based at least in part on the claim data and the one or more adjustments to generate a final price for the unpriced claim.

In various embodiments, routing at least a portion of the claim data to each of a plurality of pricing models comprises transmitting at least a portion of the claim data to one or more external systems each executing at least one pricing model. In certain embodiments, routing at least a portion of the claim data to each of a plurality of pricing models additionally comprises routing at least a portion of the claim data to a pricing model executed by the one or more processors. Moreover, the method may further comprise generating one or more claim line records based at least in part on the claim data for an unpriced claim, wherein each of the one or more claim line records corresponds to a portion of the claim data and a discrete element for pricing for the unpriced claim. In various embodiments, the one or more claim line records comprise a first claim line record corresponding to a service and a second claim line record corresponding to a product. In certain embodiments, the priority order is determined based at least in part on an identity of each of the plurality of pricing models, and wherein at least a portion of pricing data generated by a first pricing model of the plurality of pricing models is utilized as input to a second pricing model of the plurality of pricing models. In various embodiments, routing at least a portion of the claim data to each of a plurality of pricing models comprises: routing at least a portion of the claim data to a first pricing model in accordance with the priority order; determining whether pricing data generated by the first pricing model satisfies pricing criteria; and upon determining that the pricing data generated by the first pricing model satisfies the pricing criteria, routing at least a portion of the claim data to a second pricing model in accordance with the priority order.

Certain embodiments are directed to an automated system for implementing an adjudicated price for a claim, the system comprising one or more processors and at least one non-transitory memory storage area, the system configured to: receive claim data for an unpriced claim; access, from the at least one non-transitory memory storage area, a pricing schedule selected based at least in part on the claim data, wherein the pricing schedule identifies a plurality of pricing models; route at least a portion of the claim data to each of the plurality of pricing models in accordance with a priority order for execution of the pricing models in accordance with the priority order; consolidate pricing data generated from each of the plurality of pricing models, wherein the pricing data generated from each of the plurality of pricing models identifies an allowed amount generated for the claim in accordance with the pricing model; adjudicate the allowed amounts generated from each of the plurality of pricing models based at least in part on the claim data and the pricing data to identify a pricing model for generating a price for the unpriced claim; access an accumulator table identifying one or more adjustments corresponding to at least a portion of the claim data; and adjust the pricing data of the identified pricing model based at least in part on the claim data and the one or more adjustments to generate a final price for the unpriced claim.

In various embodiments, routing at least a portion of the claim data to each of a plurality of pricing models comprises transmitting at least a portion of the claim data to one or more external systems each executing at least one pricing model. In certain embodiments, routing at least a portion of the claim data to each of a plurality of pricing models additionally comprises routing at least a portion of the claim data to a pricing model executed by the one or more processors. In various embodiments, the system is further configured to: generating one or more claim line records based at least in part on the claim data for an unpriced claim, wherein each of the one or more claim line records corresponds to a portion of the claim data and a discrete element for pricing for the unpriced claim. In certain embodiments, the one or more claim line records comprise a first claim line record corresponding to a service and a second claim line record corresponding to a product. In various embodiments, the priority order is determined based at least in part on an identity of each of the plurality of pricing models, and wherein at least a portion of pricing data generated by a first pricing model of the plurality of pricing models is utilized as input to a second pricing model of the plurality of pricing models. In certain embodiments, routing at least a portion of the claim data to each of a plurality of pricing models comprises: routing at least a portion of the claim data to a first pricing model in accordance with the priority order; determining whether pricing data generated by the first pricing model satisfies pricing criteria; and upon determining that the pricing data generated by the first pricing model satisfies the pricing criteria, routing at least a portion of the claim data to a second pricing model in accordance with the priority order.

Certain embodiments are directed to a computer program product comprising a non-transitory computer readable medium having computer program instructions stored therein, the computer program instructions when executed by a processor, cause the processor to: receive claim data for an unpriced claim; access, from at least one memory storage area, a pricing schedule selected based at least in part on the claim data, wherein the pricing schedule identifies a plurality of pricing models; route at least a portion of the claim data to each of the plurality of pricing models in accordance with a priority order for execution of the pricing models in accordance with the priority order; consolidate, in at least one memory storage area, pricing data generated from each of the plurality of pricing models, wherein the pricing data generated from each of the plurality of pricing models identifies an allowed amount generated for the claim in accordance with the pricing model; adjudicate the allowed amounts generated from each of the plurality of pricing models based at least in part on the claim data and the pricing data to identify a pricing model for generating a price for the unpriced claim; access, from the at least one memory storage area, an accumulator table identifying one or more adjustments corresponding to at least a portion of the claim data; and adjust the pricing data of the identified pricing model based at least in part on the claim data and the one or more adjustments to generate a final price for the unpriced claim.

In various embodiments, routing at least a portion of the claim data to each of a plurality of pricing models comprises transmitting at least a portion of the claim data to one or more external systems each executing at least one pricing model. In certain embodiments, routing at least a portion of the claim data to each of a plurality of pricing models additionally comprises routing at least a portion of the claim data to a pricing model executed by the one or more processors. According to various embodiments, the computer program instructions when executed by a processor, further cause the processor to generating one or more claim line records based at least in part on the claim data for an unpriced claim, wherein each of the one or more claim line records corresponds to a portion of the claim data and a discrete element for pricing for the unpriced claim. In certain embodiments, the one or more claim line records comprise a first claim line record corresponding to a service and a second claim line record corresponding to a product. In various embodiments, the priority order is determined based at least in part on an identity of each of the plurality of pricing models, and wherein at least a portion of pricing data generated by a first pricing model of the plurality of pricing models is utilized as input to a second pricing model of the plurality of pricing models. In certain embodiments, routing at least a portion of the claim data to each of a plurality of pricing models comprises: routing at least a portion of the claim data to a first pricing model in accordance with the priority order; determining whether pricing data generated by the first pricing model satisfies pricing criteria; and upon determining that the pricing data generated by the first pricing model satisfies the pricing criteria, routing at least a portion of the claim data to a second pricing model in accordance with the priority order.

BRIEF DESCRIPTION OF THE SEVERAL VIEWS OF THE DRAWINGS

Reference will now be made to the accompanying drawings, which are not necessarily drawn to scale, and wherein:

FIGS. 7A-9 illustrate additional user interfaces according to one embodiment.

DETAILED DESCRIPTION

Figure 1:
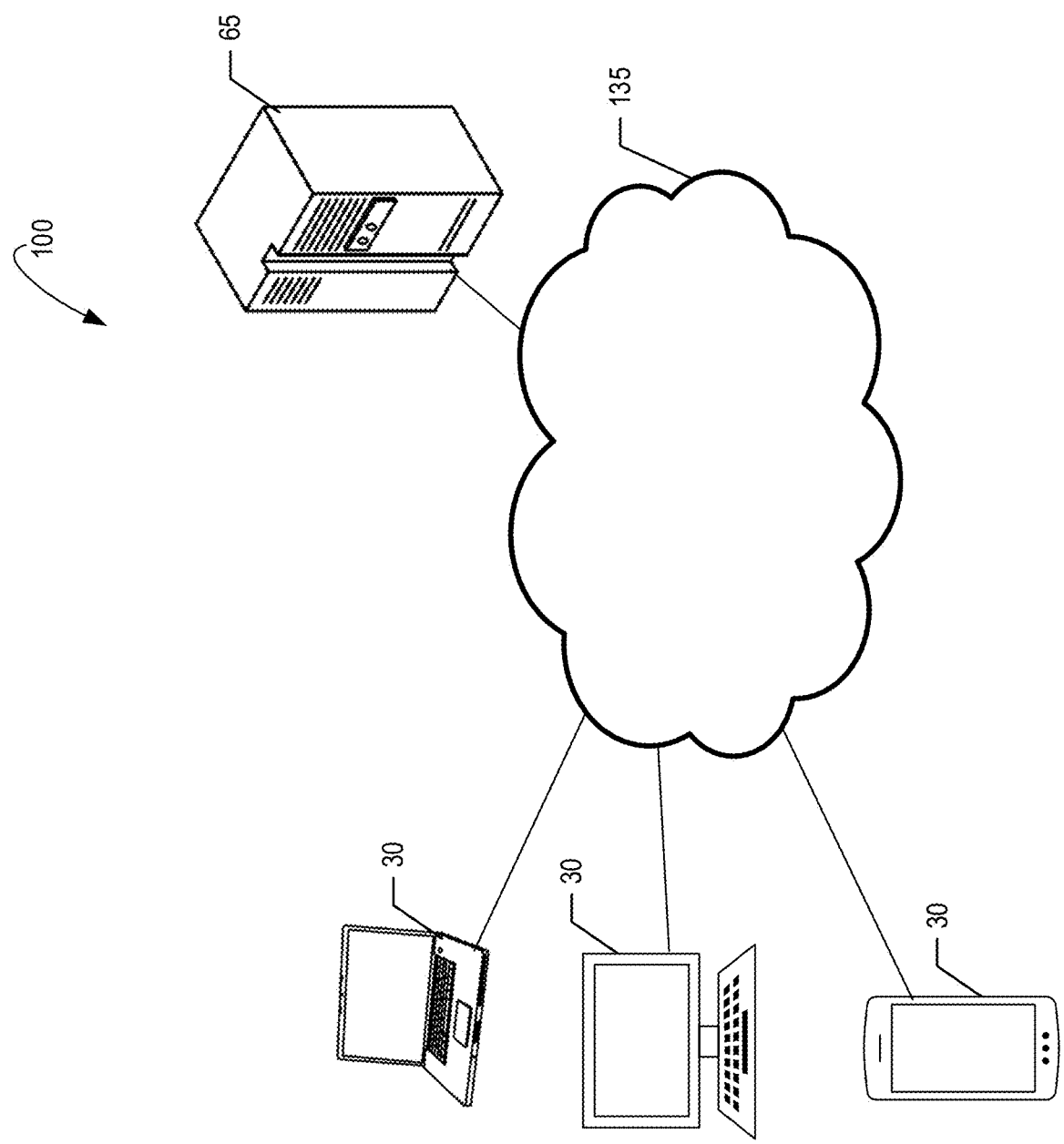
FIG. 1 is a diagram of a system that can be used in conjunction with various embodiments of the present invention.

The present disclosure more fully describes various embodiments with reference to the accompanying drawings. It should be understood that some, but not all embodiments are shown and described herein. Indeed, the embodiments may take many different forms, and accordingly this disclosure should not be construed as limited to the embodiments set forth herein. Rather, these embodiments are provided so that this disclosure will satisfy applicable legal requirements. Like numbers refer to like elements throughout.

I. COMPUTER PROGRAM PRODUCTS, METHODS, AND COMPUTING ENTITIES

Embodiments of the present invention may be implemented in various ways, including as computer program products that comprise articles of manufacture. Such computer program products may include one or more software components including, for example, software objects, methods, data structures, and/or the like. A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform. Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present invention may also be implemented as methods, apparatus, systems, computing devices, computing entities, and/or the like. As such, embodiments of the present invention may take the form of a data structure, apparatus, system, computing device, computing entity, and/or the like executing instructions stored on a computer-readable storage medium to perform certain steps or operations. Thus, embodiments of the present invention may also take the form of an entirely hardware embodiment, an entirely computer program product embodiment, and/or an embodiment that comprises combination of computer program products and hardware performing certain steps or operations.

Embodiments of the present invention are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

II. EXEMPLARY SYSTEM ARCHITECTURE

FIG. 1 provides an illustration of a system 100 that can be used in conjunction with various embodiments of the present invention. As shown in FIG. 1, the system 100 may comprise one or more central computing entities 65 operating a pricing engine, one or more user computing entities 30, one or more networks 135, and/or the like. Each of the components of the system may be in electronic communication with, for example, one another over the same or different wireless or wired networks 135 including, for example, a wired or wireless Personal Area Network (PAN), Local Area Network (LAN), Metropolitan Area Network (MAN), Wide Area Network (WAN), and/or the like. Additionally, while FIG. 1 illustrate certain system entities as separate, standalone entities, the various embodiments are not limited to this particular architecture.

a. Exemplary Central Computing Entity

Figure 2A:
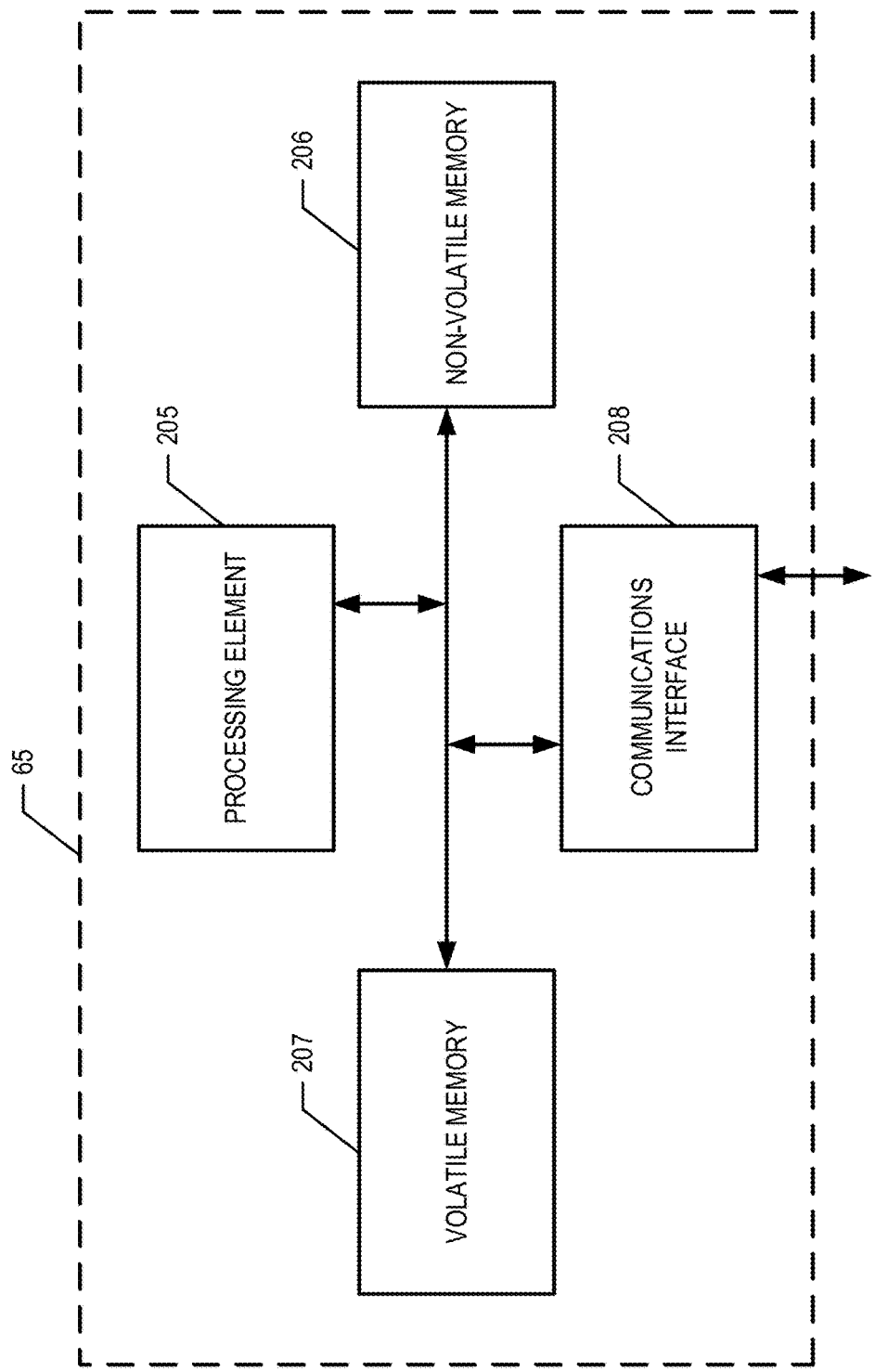
FIG. 2A is a schematic of a central computing entity in accordance with certain embodiments of the present invention.

FIG. 2A provides a schematic of a central computing entity 65 according to one embodiment of the present invention. As discussed herein, a central computing entity 65 of certain embodiments is configured to execute a pricing engine having the configuration discussed herein. In general, the terms computing entity, entity, device, system, and/or similar words used herein interchangeably may refer to, for example, one or more computers, computing entities, desktop computers, mobile phones, tablets, phablets, notebooks, laptops, distributed systems, items/devices, terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

As indicated, in one embodiment, the central computing entity 65 may also include one or more network and/or communications interfaces 208 for communicating with various computing entities, such as by communicating data, content, information, and/or similar terms used herein interchangeably that can be transmitted, received, operated on, processed, displayed, stored, and/or the like. For instance, the central computing entity may communicate with other computing entities, one or more user computing entities and/or the like.

As shown in FIG. 2A, in one embodiment, the central computing entity 65 may include or be in communication with one or more processing elements 205 (also referred to as processors, processing circuitry, and/or similar terms used herein interchangeably) that communicate with other elements within the central computing entity 65 via a bus, for example, or network connection. As will be understood, the processing element 205 may be embodied in a number of different ways. For example, the processing element 205 may be embodied as one or more complex programmable logic devices (CPLDs), microprocessors, multi-core processors, coprocessing entities, application-specific instruction-set processors (ASIPs), and/or controllers. Further, the processing element 205 may be embodied as one or more other processing devices or circuitry. The term circuitry may refer to an entirely hardware embodiment or a combination of hardware and computer program products. Thus, the processing element 205 may be embodied as integrated circuits, application specific integrated circuits (ASICs), field programmable gate arrays (FPGAs), programmable logic arrays (PLAs), hardware accelerators, other circuitry, and/or the like. As will therefore be understood, the processing element 205 may be configured for a particular use or configured to execute instructions stored in volatile or non-volatile media or otherwise accessible to the processing element 205. As such, whether configured by hardware or computer program products, or by a combination thereof, the processing element 205 may be capable of performing steps or operations according to embodiments of the present invention when configured accordingly.

In one embodiment, the central computing entity 65 may further include or be in communication with non-volatile media (also referred to as non-volatile storage, memory, memory storage, memory circuitry and/or similar terms used herein interchangeably). In one embodiment, the non-volatile storage or memory may include one or more non-volatile storage or memory media 206 as described above, such as hard disks, ROM, PROM, EPROM, EEPROM, flash memory, MMCs, SD memory cards, Memory Sticks, CBRAM, PRAM, FeRAM, RRAM, SONOS, racetrack memory, and/or the like. As will be recognized, the non-volatile storage or memory media may store databases, metadata repositories database instances, database management system entities, data, applications, programs, program modules, scripts, source code, object code, byte code, compiled code, interpreted code, machine code, executable instructions, and/or the like. The term database, database instance, database management system entity, and/or similar terms used herein interchangeably and in a general sense to refer to a structured or unstructured collection of information/data that is stored in a computer-readable storage medium.

Memory media 206 (e.g., metadata repository) may also be embodied as a data storage device or devices, as a separate database server or servers, or as a combination of data storage devices and separate database servers. Further, in some embodiments, memory media 206 may be embodied as a distributed repository such that some of the stored information/data is stored centrally in a location within the system and other information/data is stored in one or more remote locations. Alternatively, in some embodiments, the distributed repository may be distributed over a plurality of remote storage locations only. An example of the embodiments contemplated herein would include a cloud data storage system maintained by a third party provider and where some or all of the information/data required for the operation of the system may be stored. As a person of ordinary skill in the art would recognize, the information/data required for the operation of the system may also be partially stored in the cloud data storage system and partially stored in a locally maintained data storage system.

Figure 2B:
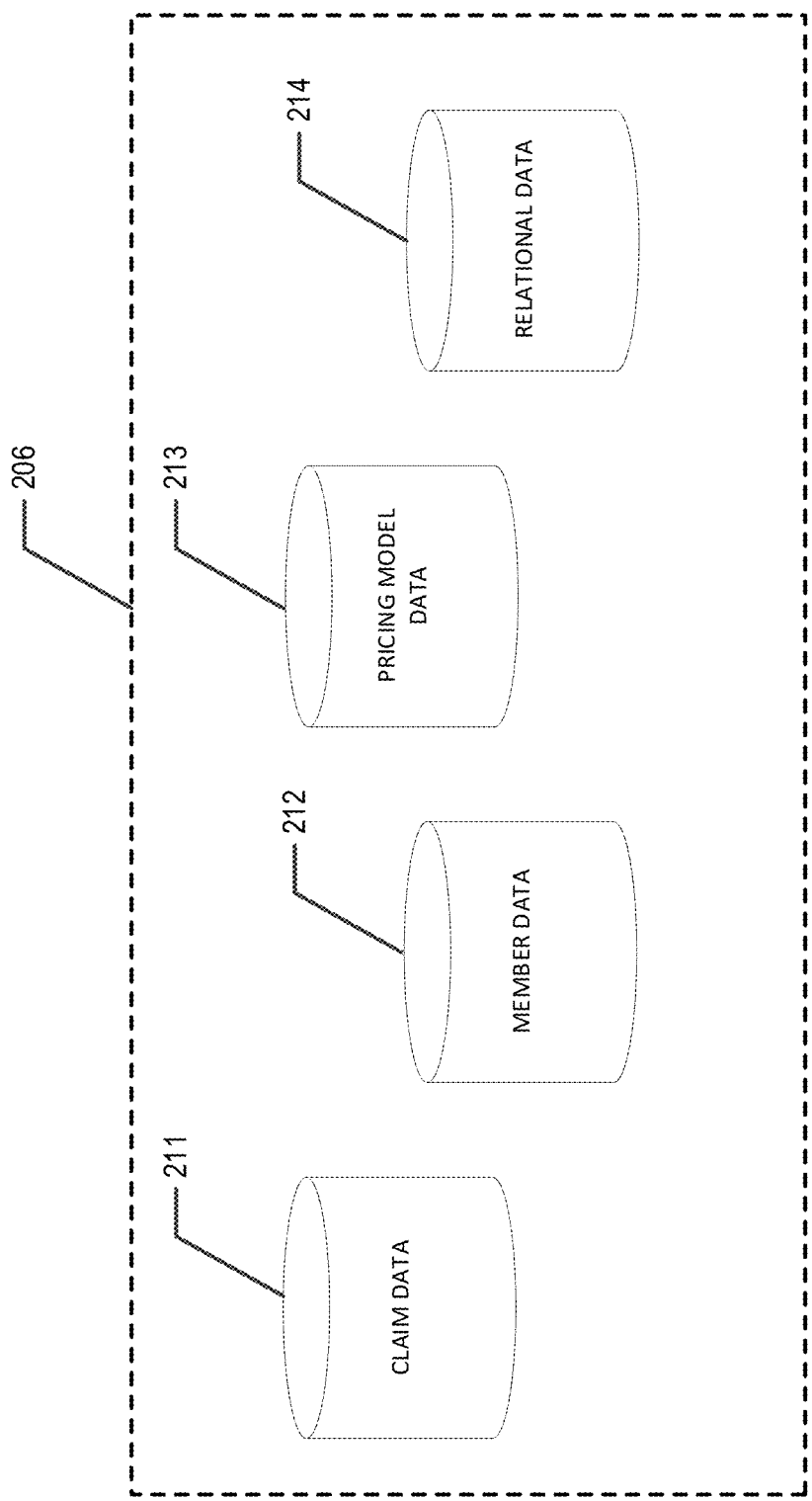
FIG. 2B is a schematic representation of a memory media storing a plurality of data assets.

Memory media 206 may include information/data accessed and stored by the system to facilitate the operations of the system. More specifically, memory media 206 may encompass one or more data stores configured to store information/data usable in certain embodiments. For example, as shown in FIG. 2B, memory media 206 may encompass a claim data database 211 configured to store (e.g., permanently or temporarily) data associated with a claim to be priced. Memory media 206 may additionally encompass member data database 212 configured to store data regarding individual members for which a claim is generated (e.g., identifying data, benefits data, and/or the like). In certain embodiments, memory media 206 may additionally encompass pricing model data database 213 comprising data associated with one or more pricing models. The pricing model data may encompass executable data for one or more pricing models executable via the pricing engine (as discussed here) and/or unique identifiers for one or more pricing models executable via external systems. In certain embodiments, the memory media 206 may additionally comprise one or more relational data databases 214, which may be configured for storing (e.g., temporarily) pricing data received from each of the pricing models during adjudication, for storing one or more datatables utilized during adjudication, and/or the like.

In one embodiment, the central computing entity 65 may further include or be in communication with volatile media (also referred to as volatile storage, memory, memory storage, memory circuitry and/or similar terms used herein interchangeably). In one embodiment, the volatile storage or memory may also include one or more volatile storage or memory media 207 as described above, such as RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. As will be recognized, the volatile storage or memory media may be used to store at least portions of the databases, database instances, database management system entities, data, applications, programs, program modules, scripts, source code, object code, byte code, compiled code, interpreted code, machine code, executable instructions, and/or the like being executed by, for example, the processing element 205. Thus, the databases, database instances, database management system entities, data, applications, programs, program modules, scripts, source code, object code, byte code, compiled code, interpreted code, machine code, executable instructions, and/or the like may be used to control certain aspects of the operation of the central computing entity 65 with the assistance of the processing element 205 and operating system.

As indicated, in one embodiment, the central computing entity 65 may also include one or more network and/or communications interfaces 208 for communicating with various computing entities, such as by communicating data, content, information, and/or similar terms used herein interchangeably that can be transmitted, received, operated on, processed, displayed, stored, and/or the like. For instance, the central computing entity 65 may communicate with computing entities or communication interfaces of other computing entities 65, user computing entities 30, and/or the like. In this regard, the central computing entity 65 may access various data assets.

As indicated, in one embodiment, the central computing entity 65 may also include one or more network and/or communications interfaces 208 for communicating with various computing entities, such as by communicating data, content, information, and/or similar terms used herein interchangeably that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOC SIS), or any other wired transmission protocol. Similarly, the central computing entity 65 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol. The central computing entity 65 may use such protocols and standards to communicate using Border Gateway Protocol (BGP), Dynamic Host Configuration Protocol (DHCP), Domain Name System (DNS), File Transfer Protocol (FTP), Hypertext Transfer Protocol (HTTP), HTTP over TLS/SSL/Secure, Internet Message Access Protocol (IMAP), Network Time Protocol (NTP), Simple Mail Transfer Protocol (SMTP), Telnet, Transport Layer Security (TLS), Secure Sockets Layer (SSL), Internet Protocol (IP), Transmission Control Protocol (TCP), User Datagram Protocol (UDP), Datagram Congestion Control Protocol (DCCP), Stream Control Transmission Protocol (SCTP), HyperText Markup Language (HTML), and/or the like.

As will be appreciated, one or more of the central computing entity's components may be located remotely from other central computing entity 65 components, such as in a distributed system. Furthermore, one or more of the components may be aggregated and additional components performing functions described herein may be included in the central computing entity 65. Thus, the central computing entity 65 can be adapted to accommodate a variety of needs and circumstances.

b. Exemplary User Computing Entity

Figure 3:
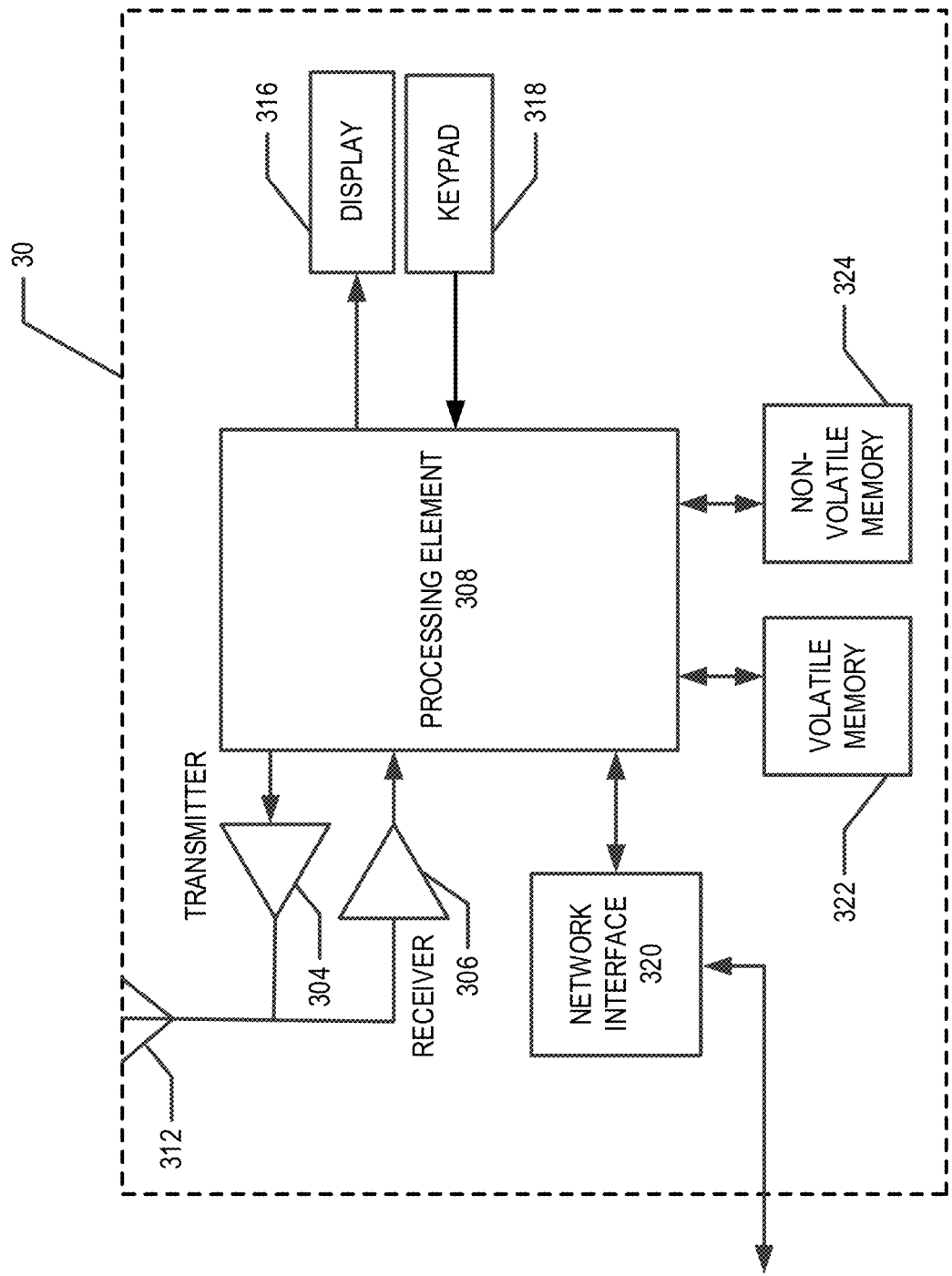
FIG. 3 is a schematic of a user computing entity in accordance with certain embodiments of the present invention.

FIG. 3 provides an illustrative schematic representative of user computing entity that can be used in conjunction with embodiments of the present invention. As will be recognized, the user computing entity may be operated by an agent and include components and features similar to those described in conjunction with the central computing entity 65. Further, as shown in FIG. 3, the user computing entity may include additional components and features. For example, the user computing entity 30 can include an antenna 312, a transmitter 304 (e.g., radio), a receiver 306 (e.g., radio), and a processing element 308 that provides signals to and receives signals from the transmitter 304 and receiver 306, respectively. The signals provided to and received from the transmitter 304 and the receiver 306, respectively, may include signaling information/data in accordance with an air interface standard of applicable wireless systems to communicate with various entities, such as a central computing entity 65, another user computing entity 30, and/or the like. In this regard, the user computing entity 30 may be capable of operating with one or more air interface standards, communication protocols, modulation types, and access types. More particularly, the user computing entity 30 may operate in accordance with any of a number of wireless communication standards and protocols. In a particular embodiment, the user computing entity 30 may operate in accordance with multiple wireless communication standards and protocols, such as GPRS, UMTS, CDMA2000, 1×RTT, WCDMA, TD-SCDMA, LTE, E-UTRAN, EVDO, HSPA, HSDPA, Wi-Fi, WiMAX, UWB, IR protocols, Bluetooth protocols, USB protocols, and/or any other wireless protocol.

Via these communication standards and protocols, the user computing entity 30 can communicate with various other entities using concepts such as Unstructured Supplementary Service data (USSD), Short Message Service (SMS), Multimedia Messaging Service (MMS), Dual-Tone Multi-Frequency Signaling (DTMF), and/or Subscriber Identity Module Dialer (SIM dialer). The user computing entity 30 can also download changes, add-ons, and updates, for instance, to its firmware, software (e.g., including executable instructions, applications, program modules), and operating system.

According to one embodiment, the user computing entity 30 may include location determining aspects, devices, modules, functionalities, and/or similar words used herein interchangeably. For example, the user computing entity 30 may include outdoor positioning aspects, such as a location module adapted to acquire, for example, latitude, longitude, altitude, geocode, course, direction, heading, speed, UTC, date, and/or various other information/data. In one embodiment, the location module can acquire data, sometimes known as ephemeris data, by identifying the number of satellites in view and the relative positions of those satellites. The satellites may be a variety of different satellites, including LEO satellite systems, DOD satellite systems, the European Union Galileo positioning systems, the Chinese Compass navigation systems, Indian Regional Navigational satellite systems, and/or the like. Alternatively, the location information/data/data may be determined by triangulating the position in connection with a variety of other systems, including cellular towers, Wi-Fi access points, and/or the like. Similarly, the user computing entity 30 may include indoor positioning aspects, such as a location module adapted to acquire, for example, latitude, longitude, altitude, geocode, course, direction, heading, speed, time, date, and/or various other information/data. Some of the indoor aspects may use various position or location technologies including RFID tags, indoor beacons or transmitters, Wi-Fi access points, cellular towers, nearby computing devices (e.g., smartphones, laptops) and/or the like. For instance, such technologies may include iBeacons, Gimbal proximity beacons, BLE transmitters, Near Field Communication (NFC) transmitters, and/or the like. These indoor positioning aspects can be used in a variety of settings to determine the location of someone or something to within inches or centimeters.

The user computing entity 30 may also comprise a user interface 1100 comprising one or more user input/output interfaces (e.g., a display 316 and/or speaker/speaker driver coupled to a processing element 308 and a touch screen, keyboard, mouse, and/or microphone coupled to a processing element 308). For example, the user output interface may be configured to provide an application, browser, user interface, dashboard, webpage, and/or similar words used herein interchangeably executing on and/or accessible via the user computing entity 30 to cause display or audible presentation of information/data and for user interaction therewith via one or more user input interfaces. The user output interface may be updated dynamically from communication with the central computing entity 65. The user input interface can comprise any of a number of devices allowing the user computing entity 30 to receive information/data, such as a keypad 318 (hard or soft), a touch display, voice/speech or motion interfaces, scanners, readers, or other input device. In embodiments including a keypad 318, the keypad 318 can include (or cause display of) the conventional numeric (0-9) and related keys (#, *), and other keys used for operating the user computing entity 30 and may include a full set of alphabetic keys or set of keys that may be activated to provide a full set of alphanumeric keys. In addition to providing input, the user input interface can be used, for example, to activate or deactivate certain functions, such as screen savers and/or sleep modes. Through such inputs the user computing entity 30 can collect information/data, user interaction/input, and/or the like.

The user computing entity 30 can also include volatile storage or memory 322 and/or non-volatile storage or memory 324, which can be embedded and/or may be removable. For example, the non-volatile memory may be ROM, PROM, EPROM, EEPROM, flash memory, MMCs, SD memory cards, Memory Sticks, CBRAM, PRAM, FeRAM, RRAM, SONOS, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. The volatile and non-volatile storage or memory can store databases, database instances, database management system entities, data, applications, programs, program modules, scripts, source code, object code, byte code, compiled code, interpreted code, machine code, executable instructions, and/or the like to implement the functions of the user computing entity 30.

c. Exemplary Networks

In one embodiment, the networks 135 may include, but are not limited to, any one or a combination of different types of suitable communications networks such as, for example, cable networks, public networks (e.g., the Internet), private networks (e.g., frame-relay networks), wireless networks, cellular networks, telephone networks (e.g., a public switched telephone network), or any other suitable private and/or public networks. Further, the networks 135 may have any suitable communication range associated therewith and may include, for example, global networks (e.g., the Internet), MANs, WANs, LANs, or PANs. In addition, the networks 135 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, satellite communication mediums, or any combination thereof, as well as a variety of network devices and computing platforms provided by network providers or other entities.

III. EXEMPLARY SYSTEM OPERATION

Details regarding various embodiments are described in reference to FIGS. 4-9.

a. Brief Overview

Certain embodiments are directed systems and methods for identifying and implementing appropriate pricing models for products and services summarized within a claim provided without a standing pricing contract. A single claim may encompass a plurality of claim line items (also referred to herein as claim service lines) each corresponding to a particular discrete priceable element of a claim. For example, various embodiments are configured for identifying and implementing appropriate pricing strategies for healthcare services (and/or healthcare goods that may be provided along with the healthcare services) provided to a member of a payer, but provided by a healthcare provider that is not in-network (e.g., having an existing payment contract with) the payer. Certain embodiments are configured to calculate applicable pricing amounts for one or more claims received at a pricing engine utilizing a plurality of optionally available pricing models, which may encompass one or more internally calculated pricing models (implemented by the pricing engine) and/or one or more externally calculated pricing models (implemented by one or more external systems). Each of these pricing models may be configured to generate pricing data identifying an allowable amount for the claim and/or individual claim service lines (e.g., identifying a maximum allowable payment amount in accordance with the pricing model). The pricing engine according to various embodiments utilizes a complex set of routing rules to identify one or more appropriate pricing models for identifying an allowed amount for a particular received claim. The routing rules of certain embodiments utilize a plurality of claim characteristics, such as one or more of: a claim type (e.g., an institutional or a professional claim), a benefit status (e.g., a benefit Par status, such as in-network (INN) or out-of-network (OON)), procedure/product type (e.g., lab procedures, DME procedures, radiology procedures, and/or the like), one or more pricing methods (e.g., UCR, SSP, OCM, and/or the like), one or more auxiliary pricing options (e.g., adjustments), fall through amounts, comparison logic, and/or the like. By calculating applicable pricing amounts via the plurality of available pricing models, the system generates and/or receives data regarding each of the pricing models to enable a detailed comparison between pricing models, and ultimately an identification of a most-appropriate pricing model for implementation for a particular claim.

One or more pricing models may be added and/or configured for use with the pricing engine in certain embodiments. External pricing entities may be configured for interaction with the pricing engine, and pricing schedules may be generated for each new external pricing entity, each pricing schedule may be provided to comprise data indicative of a breakdown of how to price various products/services under a plurality of scenarios (e.g., all scenarios), such as INN or OON benefits and/or professional or institutional benefits. Moreover, pricing methods, amounts, and/or comparison logic may be configured for each pricing model within each possible pricing scenarios.

Utilization of the pricing engine may proceed for a pricing instance generated for a claim by utilizing an appropriate pricing schedule associated with the claim (e.g., OON pricing schedule associated with a benefit plan associated with the claim). The pricing engine iterates through a plurality of pricing models identified as potentially applicable through routing of the claim. A most-appropriate pricing model is then selected in accordance with one or more selection models. Applicable reductions/adjustments may be applied to a price generated by the selected pricing model, and the allowed pricing amount may be finalized, for example, by generating and/or transmitting pricing reports to applicable computing systems.

1. Technical Problem

Standard practices for determining an appropriate price for goods and/or services provided without an already standardized pricing model—often arising in payments for medical services provided by Out-of-Network (OON) healthcare providers to a member associated with a particular payor—required a significant amount of manual user interaction (e.g., provided by a trained administrator and/or claim evaluator personnel). Because each claim may be subject to differing payment requirements (e.g., regulations), personnel are often required to ensure applicable requirements are met for each individual claim. Technically, each claim may encompass different substantive data, different data formats, different data types, and/or other differences that have historically further inhibited automated processes for identifying and implementing appropriate pricing models. Further adding to this difficulty, various pricing models, including those pricing models executable by external systems, often have different data input requirements, both in terms of differences in substantive data as well as differences in data formatting, that may require substantial manipulation of claims data before providing claims data to various external systems for executing various pricing models.

2. Technical Solution

Various embodiments utilize a pricing engine configured to receive claims data as input and to provide claims data in appropriate formats to a plurality of pricing models so as to enable those pricing models to execute on appropriate claims data. Various embodiments effectively route and streamline claims pricing via configurable systems and methods enabling satisfaction of flexible configuration rules. The pricing models—which may encompass internally executed pricing models (e.g., executing at the centralized data distributor) and/or externally executed pricing models (e.g., executing at separate, third party computing systems)—provide pricing results back to the centralized pricing engine to enable an appropriate comparison between pricing models for a particular claim. The centralized pricing engine of certain embodiments is further configured to execute one or more comparison models to identify a most-appropriate pricing model for use with a particular claim, and the centralized pricing engine is configured to implement the identified most-appropriate pricing model, for example, by generating a pricing report, initiating a funds transfer, and/or the like. By ensuring that each available payment model executable based on claims data input, various embodiments are capable of making appropriate comparisons between pricing models automatically so as to determine a most-appropriate pricing model that satisfies applicable payment requirements. Moreover, because the centralized pricing engine is configurable and highly flexible, various embodiments may be adapted to accommodate newly developed pricing strategies without drastic system changes. Specifically, various embodiments utilize a highly modular configuration that breaks down the applicability of various pricing models to enable adaptability to new pricing breakdowns.

b. Pricing Model Configuration

The pricing engine is associated with a plurality of pricing models each usable to generate pricing data for specific claims (having corresponding claims data received at the pricing engine). One or more pricing models may be incorporated into the pricing engine and/or one or more pricing models may be accessed by the pricing engine (e.g., via external computing systems). As an example, the pricing engine may be associated with one or more fee schedules, such as a Usual, Customary, and Reasonable (UCR) fee schedule and/or a Centers for Medicare & Medicaid Services (CMS) fee schedule, a vender-based pricing model, one or more pricing schedules, a Shared Services Plan (SSP)

pricing model, and/or the like. Each of the one or more pricing models that may be associated with the pricing engine are configured for passing output data, such as pricing data back to the pricing engine for adjudication and/or comparison and selection of an appropriate pricing model for a particular claim. To enable generation of these output values, the pricing models are configured in accordance with the pricing engine for appropriate communication of data therebetween. For example, for data shared between the pricing engine and one or more external systems executing corresponding pricing models, one or more Application Program Interfaces (APIs) may be provided for data communication.

Moreover, the one or more pricing models associated with the pricing engine may be assigned to one or more benefits bundles and/or other characteristics of particular claims. For example, during configuration of a pricing model, the pricing engine may assign one or more characteristic flags to a particular pricing model, with each characteristic flag indicating characteristics of claims to be priced via the pricing model. In such embodiments, each claim may have corresponding characteristics that may be matched with characteristic flags of one or more pricing models. Accordingly, claims may be routed (in an order to be determined by the pricing engine, as discussed herein) to pricing models having corresponding characteristic flags).

In certain embodiments, the pricing engine may be associated with one or more fee schedules usable to identify one or more pricing models applicable to claim characteristics and/or to identify a priority order for executing one or more pricing models. As just one example, a UCR fee schedule defines the amount paid for products/services (e.g., medical services) in a geographic area based at least in part on what providers in the area typically charge for the same or similar products/services. Such data may be generated at least in part on historical data that may be collected and/or summarized by one or more entities. In certain embodiments, the UCR fee schedule may be generated externally by an external system and provided for use internally by the pricing engine. In other embodiments, the pricing engine may be configured to generate the UCR fee schedule based on accessible historical data from a historical database.

The UCR fee schedule may comprise data indicative of a plurality of fee amounts for each of a plurality of products/services. In certain embodiments, the fee amounts are organized by percentiles indicative of different average rates billed in a designated geographic region by different providers. For example, if the $80^{th}$ percentile for a given service is $100, this data indicates that at least approximately 80% of the providers in that region bill $100 or less for the given service. As discussed herein, the characteristics and/or metadata associated with a particular claim for which pricing data is requested may specify a percentile for use in generating pricing data. Such data indicative of a specified percentile may be automatically generated (e.g., based on rules stored within memory accessible to the pricing engine) or manually generated (e.g., based on user input provided during generation of an initial request for pricing of a claim).

Moreover, the UCR fee schedule may comprise a plurality of data sets each corresponding to a particular claim type. As just one example, a first claim type (e.g., an "institutional" claim type) may correspond to a first data set of the UCR fee schedule. Moreover, the first data set may be accessible via an external system, such that claims of the first claim type (e.g., institutional claims) may be routed to a first external system for pricing. A second claim type (e.g., a "professional" claim type) may correspond to a second data set of the UCR fee schedule. In certain embodiments, the second data set may be stored locally at the pricing engine and may be updated based on data received from an external system). Accordingly, when utilizing a UCR fee schedule for pricing a claim, routing of the claim data to the appropriate sub-model of the UCR fee schedule pricing model comprises a first routing step to select an appropriate data set for use with pricing the claim (and accordingly determining whether the claim data is routed to an external system or reviewed internally at the pricing engine), and a second routing set to select an appropriate percentile for calculating pricing for the claim.

Another example pricing model particularly applicable to medical services pricing comprises a CMS pricing model having medical service rates provided by region. The CMS pricing model may be implemented via an internal pricing model executable by the pricing engine, wherein the internal pricing model receives pricing data for implementation from an external data source. In such embodiments, the internal pricing model is configured for automated processing of claims and utilizes the received pricing data to update the internal pricing model.

Like the UCR fee schedule pricing model discussed above, the CMS pricing model may comprise a plurality of data sets each corresponding to particular data types. As just one example, a first claim type (e.g., an "institutional" claim type) may correspond to a first data set of the CMS pricing model. Moreover, the first data set may be accessible via a corresponding external system, such that claims of the first claim type (e.g., institutional claims) may be routed to a first external system for pricing. A second claim type (e.g., a "professional" claim type) may correspond to a second data set of the CMS pricing model. In certain embodiments, the second data set may be stored locally at the pricing engine, and may comprise further submodels for providing pricing of different service types. For example, submodels may be provided for different procedure fee schedules (PFS), each having pricing data corresponding to particular regions.

Yet another example pricing model comprises a vendor-based pricing model, utilizing one or more external vendor-based systems for generating pricing. As discussed in greater detail herein, the pricing engine utilizes a routing module (discussed herein in reference to the interface configured for providing data from the pricing engine to one or more external systems with corresponding pricing engines) to communicate appropriate data to the one or more vendor-based pricing models. The routing module utilizes stored routing data to transmit the claim data to an applicable external vendor-based pricing model system, for example, based on data generated and/or provided by the pricing engine and/or based at least in part on data stored within the claims data. As just one example, the routing data may comprise a Vendor ID, which uniquely identifies each external vendor system. The pricing engine may specify a particular Vendor ID for a claim to the routing module, which may then pass the claims data to a corresponding external vendor-based pricing model.

As yet another example pricing model, a Shared Savings Plan (SSP) pricing model may be utilized for generating pricing for one or more claims. The SSP pricing model may be executed by an external system corresponding to the SSP pricing model. In certain embodiments, the SSP pricing model may utilize claim data generated and/or supplemented by the claim engine, such as a pre-price generated for the claim. The claim engine may generate a pre-price indicating a threshold (e.g., a maximum threshold) for the SSP pricing model. In certain embodiments, the pre-price may be generated via one or more other pricing models, such as those discussed herein. In various embodiments, the SSP pricing model may be limited to particular claims, such as claims covered under a particular member's benefit plan. Determinations of whether a particular claim is covered under a particular member's benefit plan may be completed based at least in part on a pricing criteria (e.g., a maximum price, a minimum price, a maximum total consolidated price for all services provided to the member during a particular time period, and/or the like. In such embodiments, the pricing engine may be configured to utilize the pre-price generated for a particular claim to determine whether the claim is covered under the member's benefit plan, for example, utilizing a benefits accumulator (e.g., determining whether the pre-price of the claim results in an accumulated benefits value exceeding a maximum or minimum threshold for benefits coverage), and to proceed to provide claims data to the external system upon determining that the claim is covered based on the pre-price analysis.

c. Claim Data Intake and Pre-Processing

Execution of the pricing engine begins with receipt of claim data for a particular claim to be priced. As mentioned herein, claims may be reflective of one or more products and/or services, and may be indicative of products and/or services provided without an existing agreed pricing model for use for a particular claim. Although the following discussion is provided in reference specifically to pricing healthcare services provided in OON scenarios, it should be understood that various embodiments may be configured for use in a variety of industries and for pricing any of a variety of products and/or services.

Figure 4:
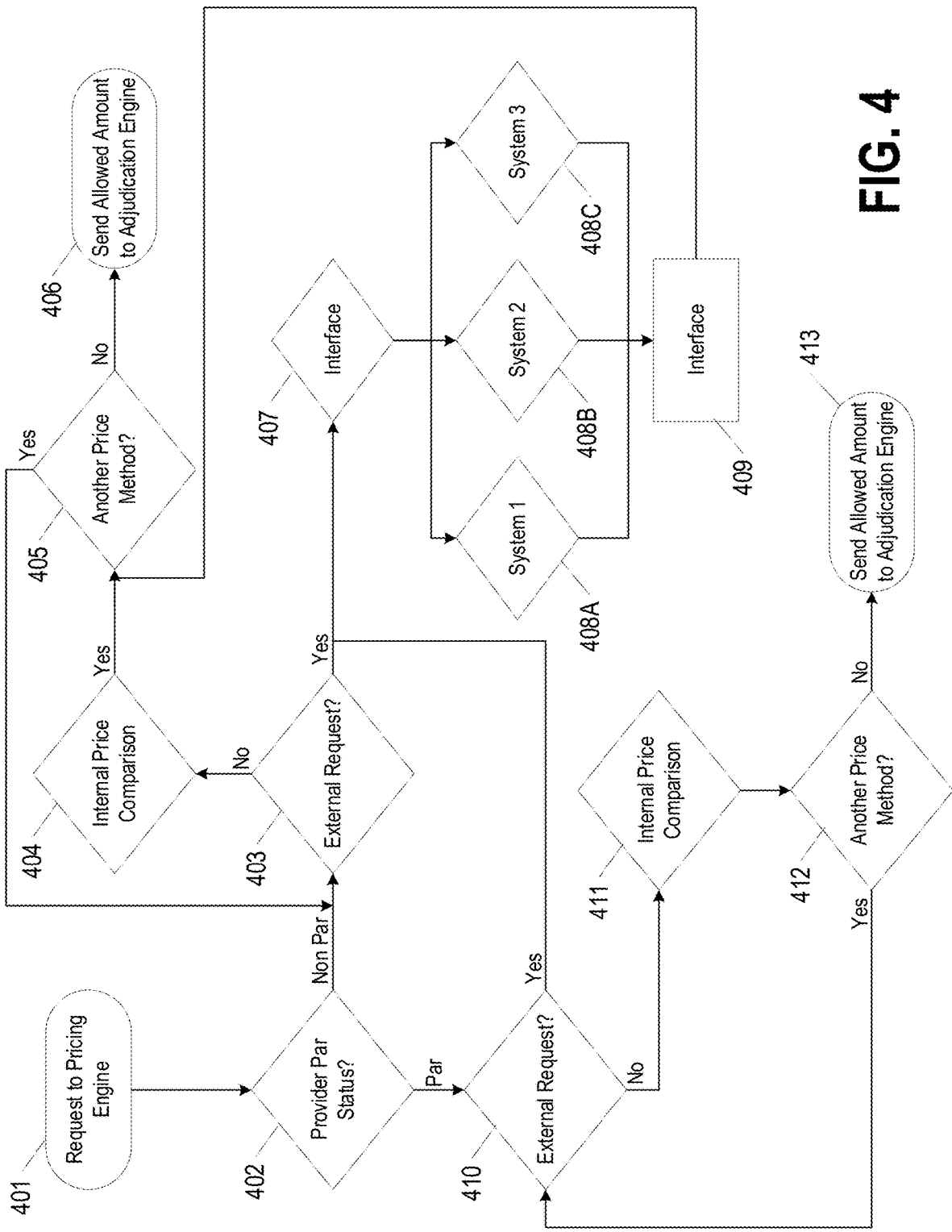
FIG. 4 is a flowchart illustrating methods for distributing claim data to one or more pricing models according to one embodiment.

Claim data may be received as a part of a request to identify an appropriate pricing model (as reflected at Block 401 of FIG. 4, discussed herein). The claim data may encompass a claim data file, such as an 837 data file commonly utilized in various healthcare systems. Moreover, the claim data may encompass and/or be accompanied by claim metadata, such as one or more of: member demographics, provider demographics, dates of service, benefit tier par status, service line status, and/or the like.

In certain embodiments, the member demographics data may encompass data identifying one or more characteristics of a member to whom healthcare services are provided. The member demographics data may comprise member identifying data (e.g., a member name, a member unique identifier, and/or the like), member benefit data (e.g., data identifying a benefit package associated with the member), and/or the like.

The provider demographics data may encompass data identifying one or more characteristics of a service provider (e.g., a healthcare service provider) that provided the products and/or services that prompted generation of the claim. The provider demographics data may encompass provider identifying data (e.g., a provider name and/or location, a provider unique identifier, and/or the like), provider specialty data (e.g., identifying a specialty associated with a provider), a provider institutional association (e.g., identifying one or more groups, hospitals, companies, and/or the like associated with provider), and/or the like.

The dates of service may identify the earliest and last dates of service, thereby identifying the time frame during which services were provided to the member by the provider.

The benefit tier par status may identify whether the provider has an agreement with a payor under the applicable benefit package applicable to the member (as reflected within the member demographics) and the benefit tier par status may be utilized as a first routing step in accordance with various embodiments, as reflected at Decision Block 402 of FIG. 4. Providers may be identified as "Par"—reflective of the provider being considered a participating provider having a payment agreement with the payor for the particular benefit package, or "Non-Par"—reflective of the provider being considered a non-participating provider that does not have a payment agreement with the payor for the particular benefit package. In certain embodiments, different pricing models may be applicable depending on a provider's benefit tier par status for a particular claim.

In various embodiments, the claim data may encompass a plurality of claim service lines, with each service line applicable to a discrete priceable element (e.g., a discrete service or product/good) provided to the member. In certain instances, a claim may have one or more service lines for which a first payment contract applies and one or more service lines for which a second payment contract applies. In such circumstances, the pricing engine may be configured to process and identify appropriate pricing models for service lines associated with a single payment contract at a particular instance. As discussed herein, a single claim may be associated with a single claim identifier, and individual claim lines having differing contract applications within a single claim may remain associated with the single claim identifier while those individual service lines are processed separately and combined as necessary upon identification of appropriate pricing models for each service line.

d. Claim Data Routing

In certain embodiments, the pricing engine acts as a routing system that generates a priority order for executing pricing models for a particular claim. The priority order may be generated based at least in part on user input (e.g., identifying a preferred order for routing claims data to one or more pricing models) and/or automatically, for example based on data indicating one or more pricing models deemed most likely to generate an appropriate price for a particular claim. Moreover, determining an appropriate order for executing pricing models may encompass referencing one or more rules, such as ordering requirements (e.g., ensuring at least one pricing model is utilized to generate a pre-price prior to executing an SSP pricing model). With reference to FIG. 4, the pricing engine may be configured to determine whether one or more externally-executed pricing models are to be utilized for generating pricing data (e.g., as reflected at decision Blocks 403 and 410), for example, after determining a par status for a particular claim. Where no external requests are necessary, the pricing engine executes an internal price comparison, as reflected at Blocks 404 and 411, before looping back to determine whether any additional pricing models are scheduled for use with a particular claim (or claim service line), as reflected at decision Blocks 405 and 412. For those pricing models encompassing an external request (as identified in accordance with decision blocks 403 and 410), the pricing engine provides claim data (discussed herein) to one or more external systems 408A-408C via an interface 407, and to receive output pricing data from those systems via the interface 409. Again, after receiving the pricing data, the pricing engine loops back to determine whether any additional pricing models are to be utilized, as reflected at Blocks 405 and 412. Ultimately, the pricing engine adjudicates the various pricing data obtained from the plurality of pricing models after sending allowed amounts from each of the pricing models for adjudication, as reflected at Blocks 406 and 413.

In various embodiments, the pricing engine may be configured to append pricing model-specific data to claims data prior to routing claims data to particular pricing engines. As discussed herein, various pricing models utilize percentages for generating pricing data indicative of an allowed amount for a particular claim (and/or claim service line), various pricing models utilize differing data sets based at least in part on certain characteristics of a claim, and/or the like. Accordingly, the pricing engine may be configured to append pricing model-specific data to claims based at least in part on determined pricing models to be utilized for a particular claim. For example, the claims data may be supplemented with data indicative of a benefits bundle applicable to a particular member that is associated with a particular claim. The data indicative of a particular benefits bundle may be utilized to identify a base price from a fee schedule, for example. Similarly, percentages to be applied to a particular base price (e.g., as discussed herein, the percentage to be utilized for selecting a particular price) may be identified based at least in part on the benefits bundle, as reflected in the data supplemented to the claims data. As non-limiting examples, UCR pricing models may utilize benefits data to identify an appropriate percentage to use for identifying pricing. Similarly, a CMS pricing model may utilize benefits data to identify an appropriate percentage for use with pricing a particular claim.

Figure 5:
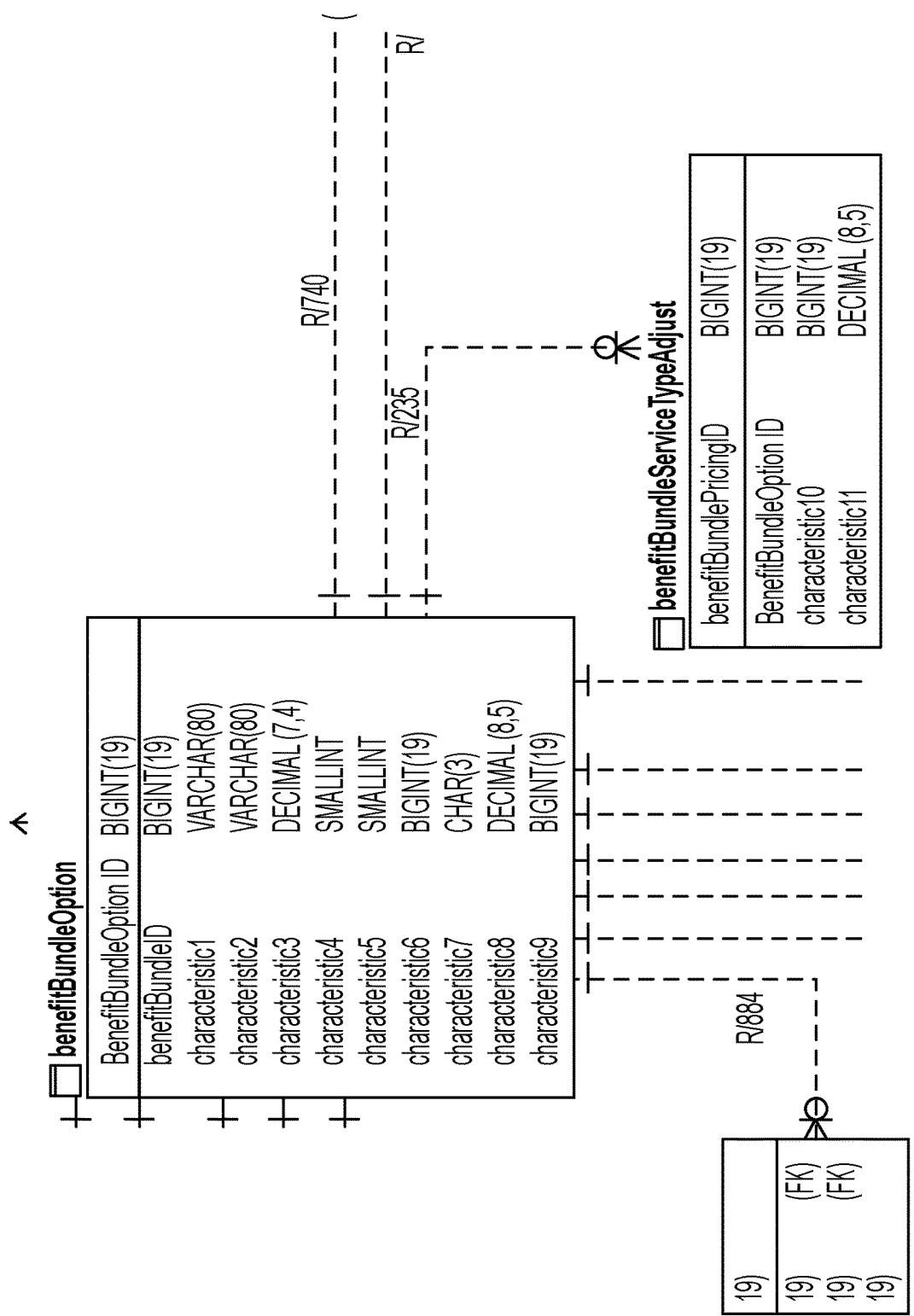
FIG. 5 illustrates a setup user interface according to one embodiment.

Moreover, additional supplemental data, such as data indicative of a service type adjustment for a particular claim, may be identified by the pricing engine and appended to the claims data. In certain embodiments, data indicative of a service type adjustment may be selected (e.g., automatically by the pricing engine or manually based at least in part on user input) from a defined set of optional service type adjustment flags. As shown in the example of FIG. 5, the service type adjustment flags may be selected from a drop-down style user interface that may be nested within a user-interface corresponding to benefits bundle options to be applied to a particular claim.

Figure 6:
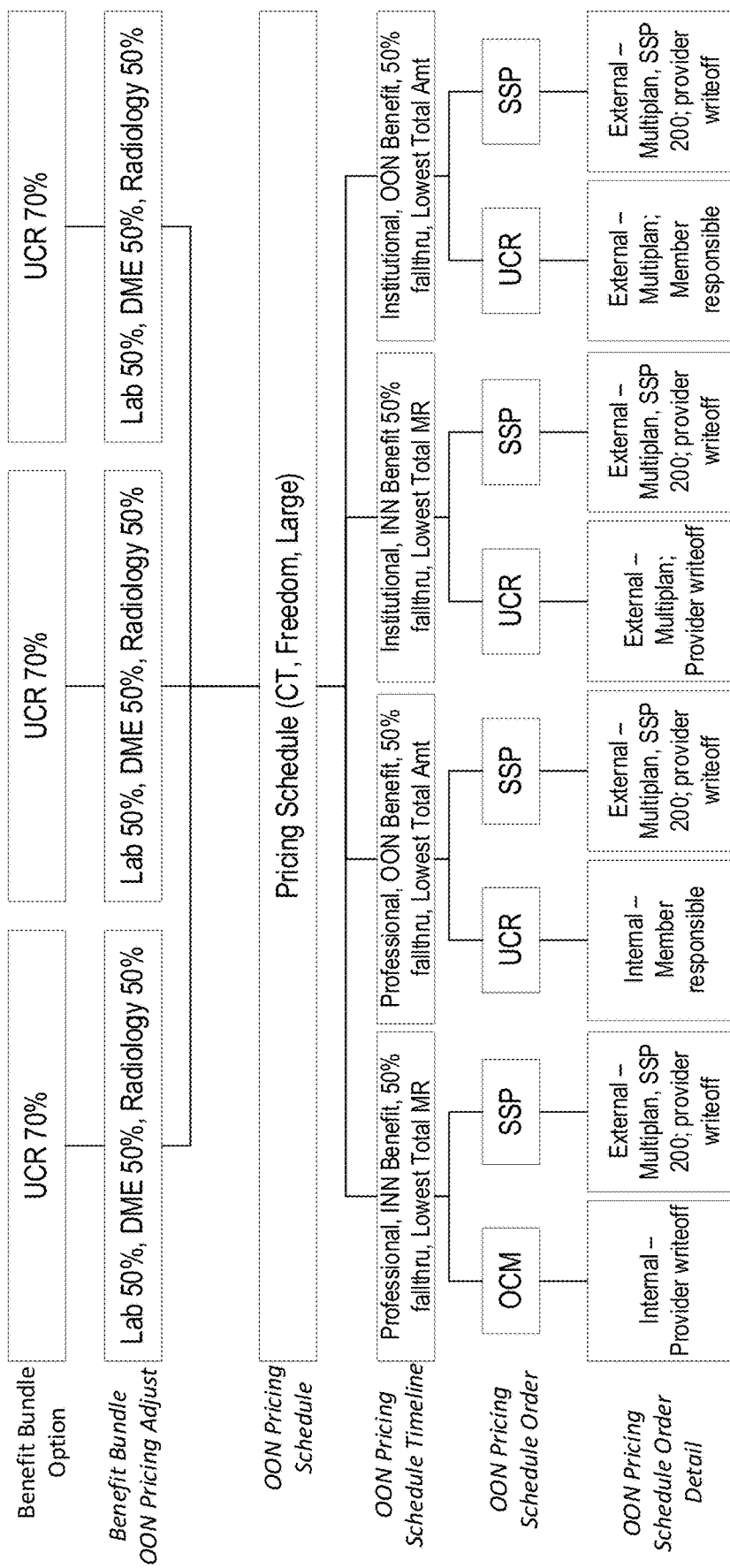
FIG. 6 illustrates a decision tree structure for determining appropriate pricing models for utilization with claim data according to one embodiment.

Based at least in part on data accompanying a particular claim and data within a pricing schedule defining a priority order for directing claims data, the claim data may be routed to applicable pricing models for execution. Moreover, within one or more pricing models, such as pricing models executing locally at the pricing engine, the data accompanying the claim may be utilized to route the claim to applicable submodels for generation of an allowed amount. With reference to FIG. 6 as an example, an internal pricing schedule executable by the pricing engine may be configured to utilize data indicative of a particular benefit bundle option and overriding adjustments to route a particular claim to a particular pricing schedule. Utilizing additional data associated with the claim, the claim may be routed in accordance with a pricing schedule timeline (e.g., corresponding to particular claim types), and within routing with a pricing schedule timeline, a pricing schedule order may be selected for the claim, which has associated pricing schedule details utilized by the pricing model to generate a price for the particular claim. Each identification of relevant aspects of a pricing schedule for a particular claim may be reflected by references between data tables within a relational database.

With particular reference to the data shown in FIG. 6, a pricing schedule contains a plurality (e.g., all) possible options for pricing a claim. Moreover, the pricing schedule timeline of certain embodiments filters one or more configuration instructions for a pricing schedule such that the pricing engine executes appropriate steps for generating a price. The pricing schedule order establishes which pricing models to use for a particular claim. For certain pricing models (e.g., SSP), the pricing schedule priority order includes pre-pricing methodologies for execution and price comparison logic to be utilized relative to the pre-pricing results. Finally, the pricing schedule order detail contains additional data instructing a pricing engine to retrieve appropriate fee schedules and/or to provide the claims data to an appropriate pricing model.

e. Pricing Model Execution

As discussed above, the pricing engine is configured to route claims data, together with supplemental data, to various pricing models based at least in part on characteristics identified within the claims data or associated supplemental data. Each of the plurality of pricing models may be configured to generate pricing data comprising an allowed amount for a particular claim based at least in part on various data within the claims data and/or the supplemental data. For example, as discussed above, one or more pricing models utilizes routing between various fee schedules for particular claims based at least in part on supplemental data corresponding to a claim.

Each of the pricing models is configured to pass output variables (e.g., encompassing a price) back to the pricing engine. Utilizing various characteristics of the claim, including an allowed amount, the pricing engine may then adjudicate the claim to determine the most appropriate pricing model (and corresponding price) to determine a final net pay for implementation of the pricing model. In certain embodiments, the allowed amount may be communicated via one or more data tables provided from the pricing models.

f. Identification and Implementation of Pricing Model

Certain embodiments are configured to identify relevant pricing models for particular claims based on data received from specific pricing models. For example, the pricing engine is configured to compare pricing data received from each of a plurality of pricing models utilized to generate prices. The pricing engine may be configured to utilize one or more adjudication modules to implement one or more adjudication factors in selecting a pricing model for generation of a price for a particular claim. The one or more adjudication factors may be identified based at least in part on characteristics of the claim, the member, the member's benefits, and/or the like.

Through execution of the adjudication process, the pricing engine is configured to maintain a high degree of transparency with respect to the pricing model utilized to generate a particular price for a claim. In certain embodiments, a pricing model utilized during generation of a price does not generate a final payment for a claim, but instead the pricing model establishes a maximum allowed payment amount, and one or more reductions and/or other adjustments may be applied to the output of the pricing model. Accordingly, to maintain a high degree of transparency, data indicative of a price history for generation of the price via the pricing model and data indicative of a price history for generation of the final price via the pricing engine may be generated and/or maintained for later access by one or more users. For example, FIGS. 7A-7B illustrate a report generated to demonstrate the process involved in generating a price for a particular claim. As shown in FIGS. 7A-7B, a pricing detail screen may be provided to illustrate the established allowed pricing amount, as established by a relevant pricing model, as well as data identifying the pricing model utilized to price claims at individual line levels, as well as any reductions and/or adjustments provided for a particular claim pricing. In various embodiments, adjustments and/or reductions relevant for a particular claim may be identified at least in part based on data stored within an accumulator table accessible to the pricing engine. The accumulator table may comprise data identifying particular claim characteristics and corresponding pricing adjustments/reductions application for claims having the related claim characteristics. The pricing engine may retrieve data indicative of appropriate adjustments and/or reductions from the accumulator table and may apply those adjustments and/or reductions to the pricing data to generate a final price for payment.

Figures 8, 9:
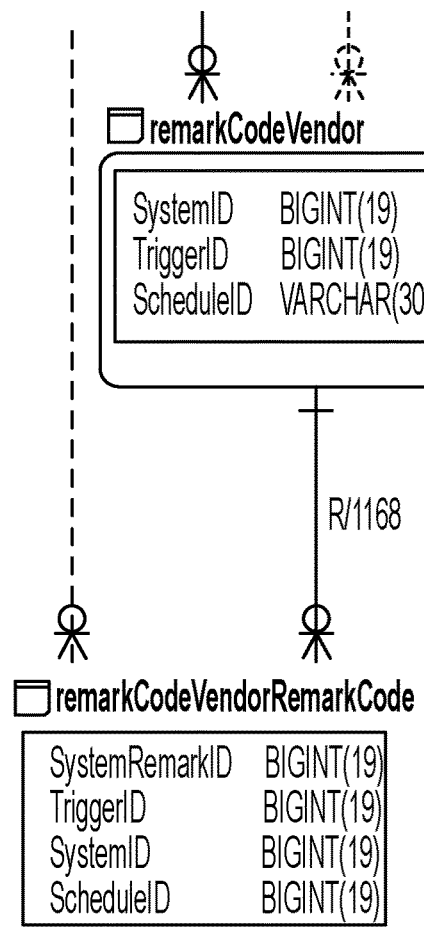

Moreover, to maintain transparency regarding pricing, the pricing engine is further configured to receive data from the pricing models indicative of one or more claim edits performed by the pricing model. The claim edits may be provided as a part of the pricing data (e.g., claim edit data) generated and provided to the pricing engine. In certain embodiments, the pricing engine maps the claim edit data to one or more action codes predefined within the pricing engine as identifying one or more claim edit actions that may be performed by the pricing engine. The pricing engine intakes the claim edit data and inserts the claim edit data into a claim edit table, thereby matching the claim edit data generated by the pricing model with actions that may be performed by the pricing engine, such that the claim edits may be instituted by the pricing engine. FIG. 8 illustrates claim edit data that may be provided by a pricing model to the pricing engine. In various embodiments, the pricing engine is further configured to provide data indicative of one or more claim edits performed by the pricing model via the pricing detail screen.

In certain embodiments, the pricing engine is further configured to receive remarks data from the one or more pricing models, and to translate the received remarks data into remarks codes of the pricing engine. In certain embodiments, the remarks data is mapped to remarks codes after executing the pricing model, and the remarks data is mapped to remarks codes to provide additional explanation of benefits for members (e.g., such that the remarks codes may be provided via the pricing detail screen. For example, as shown in FIG. 9, the remarks data is associated with remarks codes of the pricing engine, such that the pricing model remarks are reflected within summary data provided to a member (or administrative user).

IV. CONCLUSION

Many modifications and other embodiments will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A computer-implemented method comprising:
receiving, by one or more processors, unpriced claim data, wherein the unpriced claim data has a first format, is generated by a claim engine and comprises threshold pricing data and characteristic data for at least one claim;
selecting, by the one or more processors, a plurality of executable pricing models based at least in part on the characteristic data for the at least one claim, wherein the plurality of executable pricing models comprises one or more internally executable pricing models executable by the one or more processors and one or more externally executable pricing models executable by one or more external computing entities;
prioritizing, by the one or more processors, the plurality of executable pricing models by executing a comparison model for at least a portion of the characteristic data for the at least one claim, wherein the comparison model outputs a priority order data set defining executable routing rules for sequentially routing at least a portion of the unpriced claim data to each of the plurality of executable pricing models in series, wherein the plurality of executable pricing models comprises at least a first internally executable pricing model of the one or more internally executable pricing models and at least a first externally executable pricing model of the one or more externally executable pricing models;
sequentially routing, by one or more processors, at least a portion of the unpriced claim data to each of the plurality of executable pricing models including the first internally executable pricing model and the first externally executable pricing model, wherein sequentially routing the at least a portion of the unpriced claim data comprises:
converting at least a first portion of the unpriced claim data into a first pricing model-specific unpriced claim data set formatted for the first internally executable pricing model;
providing the first pricing model-specific unpriced claim data set as input to at least the first internally executable pricing model to initiate at least the first internally executable pricing model to generate first pricing data for the unpriced claim data;
converting at least a second portion of the unpriced claim data into a second pricing model-specific unpriced claim data set formatted for the first externally executable pricing model executable by a first external computing entity of the one or more external computing entities; and
transmitting, using an Application Programming Interface (API), the second pricing model-specific unpriced claim data set to the first external computing entity to cause the first external computing entity to initiate at least the first externally executable pricing model, and receiving, using the API, second pricing data generated by at least the first externally executable pricing model for the unpriced claim data;
consolidating, by the one or more processors and in a memory, pricing data generated from each of the selected plurality of pricing models comprising the first pricing data and the second pricing data, wherein the first pricing data and the second pricing data identify an allowed amount generated for the unpriced claim data by the first internally executable pricing model and the first externally executable pricing model, respectively;
comparing, by the one or more processors, the allowed amounts generated from each of the plurality of selected pricing models based at least in part on the unpriced claim data and the pricing data generated from each of the plurality of selected pricing models to identify a final pricing model selected from the first internally executable pricing model and the first externally executable pricing model for generating pricing data for the unpriced claim data;

accessing, by the one or more processors and from the memory, an accumulator table identifying one or more adjustments for at least a portion of the unpriced claim data; and adjusting, by the one or more processors, final pricing data output from the final pricing model based at least in part on the unpriced claim data and the one or more adjustments to generate a final price for the unpriced claim data.

2. The computer-implemented method of claim 1, wherein routing at least a portion of the unpriced claim data to at least the first externally executable pricing model comprises transmitting at least a portion of the unpriced claim data to one or more external systems each executing at least one pricing model.

3. The computer-implemented method of claim 2, wherein routing at least a portion of the unpriced claim data to at least the first internally executable pricing model comprises routing at least a portion of the unpriced claim data to a pricing model executed by the one or more processors.

4. The computer-implemented method of claim 1, further comprising:

generating one or more claim line records based at least in part on the unpriced claim data, wherein each of the one or more claim line records is for a portion of the unpriced claim data and a discrete element for generating pricing data for the unpriced claim data.

5. The computer-implemented method of claim 4, wherein the one or more claim line records comprise a first claim line record corresponding to a service and a second claim line record corresponding to a product.

6. The computer-implemented method of claim 1, wherein the priority order is determined based at least in part on an identity of each of the selected plurality of pricing models, and wherein at least a portion of pricing data generated by one first pricing model of the plurality of pricing models is utilized as input to a second pricing model of the plurality of pricing models.

7. The computer-implemented method of claim 1, wherein routing at least a portion of the unpriced claim data to each of the selected plurality of pricing models comprises:

routing at least a portion of the unpriced claim data to a third pricing model in accordance with the priority order;

determining whether pricing data generated by the third pricing model satisfies pricing criteria; and upon determining that the pricing data generated by the third pricing model satisfies the pricing criteria, routing at least a portion of the unpriced claim data to a fourth pricing model in accordance with the priority order.

8. A system comprising one or more processors and at least one non-transitory memory, the system configured to:

receive unpriced claim data, wherein the unpriced claim data has a first format, is generated by a claim engine and comprises threshold pricing data and characteristic data for at least one claim;

select a plurality of executable pricing models based at least in part on the characteristic data for the at least one claim, wherein the plurality of executable pricing models comprises one or more internally executable pricing models executable by the one or more processors and one or more externally executable pricing models executable by one or more external computing entities;

prioritize the plurality of executable pricing models by executing a comparison model for at least a portion of the characteristic data for the at least one claim, wherein the comparison model outputs a priority order data set defining executable routing rules for sequentially routing at least a portion of the unpriced claim data to each of the plurality of executable pricing models in series, wherein the plurality of executable pricing models comprises at least a first internally executable pricing model of the one or more internally executable pricing models and at least a first externally executable pricing model of the one or more externally executable pricing models;

sequentially route at least a portion of the unpriced claim data to each of the plurality of executable pricing models including the first internally executable pricing model and the first externally executable pricing model, wherein sequentially routing the at least a portion of the unpriced claim data comprises:

converting at least a first portion of the unpriced claim data into a first pricing model-specific unpriced claim data set formatted for the first internally executable pricing model;

providing the first pricing model-specific unpriced claim data set as input to at least the first internally executable pricing model to initiate at least the first internally executable pricing model to generate pricing data for the unpriced claim data;

converting at least a second portion of the unpriced claim data into a second pricing model-specific unpriced claim data set formatted for the first externally executable pricing model executable by a first external computing entity of the one or more external computing entities; and transmitting the second pricing model-specific unpriced claim data set to the first external computing entity using an Application Programming Interface (API) to cause the first external computing entity to initiate at least the first externally executable pricing model, and receiving second pricing data generated by at least the first externally executable pricing model for the unpriced claim data using the API;

consolidate pricing data generated from each of the selected plurality of pricing models comprising the first pricing data and the second pricing data, wherein the first pricing data and the second pricing data identify an allowed amount generated for the unpriced claim data by the first internally executable pricing model and the first externally executable pricing model, respectively;

compare the allowed amounts generated from each of the plurality of selected pricing models based at least in part on the unpriced claim data and the pricing data generated from each of the plurality of selected pricing models to identify a final pricing model selected from the first internally executable pricing model and the first externally executable pricing model for generating pricing data for the unpriced claim data;

access an accumulator table identifying one or more adjustments corresponding to at least a portion of the unpriced claim data; and adjust final pricing data output from the final pricing model based at least in part on the unpriced claim data and the one or more adjustments to generate a final price for the unpriced claim data.

9. The automated system of claim 8, wherein routing at least a portion of the unpriced claim data to at least the first externally executable pricing model comprises transmitting at least a portion of the unpriced claim data to one or more external systems each executing at least one pricing model.

10. The automated system of claim 9, wherein routing at least a portion of the unpriced claim data to at least the first internally executable pricing model comprises routing at least a portion of the unpriced claim data to a pricing model executed by the one or more processors.

11. The automated system of claim 8, wherein the system is further configured to:
generate one or more claim line records based at least in part on the unpriced claim data, wherein each of the one or more claim line records is for a portion of the unpriced claim data and a discrete element for generating pricing data for the unpriced claim data.

12. The automated system of claim 11, wherein the one or more claim line records comprise a first claim line record corresponding to a service and a second claim line record corresponding to a product.

13. The automated system of claim 8, wherein the priority order is determined based at least in part on an identity of each of the selected plurality of pricing models, and wherein at least a portion of pricing data generated by one first pricing model of the plurality of pricing models is utilized as input to a second pricing model of the plurality of pricing models.

14. The automated system of claim 8, wherein routing at least a portion of the unpriced claim data to each of the selected plurality of pricing models comprises:
routing at least a portion of the unpriced claim data to a third pricing model in accordance with the priority order;
determining whether pricing data generated by the third pricing model satisfies pricing criteria; and
upon determining that the pricing data generated by the third pricing model satisfies the pricing criteria, routing at least a portion of the unpriced claim data to a fourth pricing model in accordance with the priority order.

15. A computer program product comprising a non-transitory computer readable medium having computer program instructions stored therein, the computer program instructions when executed by at least one processor, cause the at least one processor to:
receive unpriced claim data, wherein the unpriced claim data has a first format, is generated by a claim engine and comprises threshold pricing data and characteristic data for one or more claims;
select a plurality of executable pricing models based at least in part on the characteristic data for the at least one claim, wherein the plurality of executable pricing models comprises one or more internally executable pricing models executable by the one or more processors and one or more externally executable pricing models executable by one or more external computing entities;
prioritize the plurality of executable pricing models by executing a comparison model for at least a portion of the characteristic data for the at least one claim, wherein the comparison model outputs a priority order data set defining executable routing rules for sequentially routing at least a portion of the unpriced claim data to each of the plurality of executable pricing models in series, wherein the plurality of executable pricing models comprises at least a first internally executable pricing model of the one or more internally executable pricing models and at least a first externally executable pricing model of the one or more externally executable pricing models;
sequentially route at least a portion of the unpriced claim data to each of the plurality of executable pricing models including the first internally executable pricing model and the first externally executable pricing model, wherein sequentially routing the at least a portion of the unpriced claim data comprises:
converting at least a first portion of the unpriced claim data into a first pricing model-specific unpriced claim data set formatted for the first internally executable pricing model;
providing the first pricing model-specific unpriced claim data set as input to at least the first internally executable pricing model to initiate at least the first internally executable pricing model to generate pricing data for the unpriced claim data;
converting at least a second portion of the unpriced claim data into a second pricing model-specific unpriced claim data set formatted for the first externally executable pricing model executable by a first external computing entity of the one or more external computing entities; and
transmitting the second pricing model-specific unpriced claim data set to the external computing entity using an Application Programming Interface (API) to cause the first external computing entity to initiate at least the first externally executable pricing model, and receiving second pricing data generated by at least the first externally executable pricing model for the unpriced claim data using the API;
consolidate, in the memory, pricing data generated from each of the selected plurality of pricing models comprising the first pricing data and the second pricing data, wherein the first pricing data and the second pricing data identify an allowed amount generated for the unpriced claim data by the first internally executable pricing model and the first externally executable pricing model, respectively;
compare the allowed amounts generated from each of the selected plurality of pricing models based at least in part on the unpriced claim data and the pricing data generated from each of the plurality of selected pricing models to identify a final pricing model selected from the first internally executable pricing model and the first externally executable pricing model for generating pricing data for the unpriced claim data;
access, from the memory, an accumulator table identifying one or more adjustments corresponding to at least a portion of the unpriced claim data; and
adjust final pricing data output from the final pricing model based at least in part on the unpriced claim data and the one or more adjustments to generate a final price for the unpriced claim.

16. The computer program product of claim 15, wherein routing at least a portion of the unpriced claim data to at least the first externally executable pricing model comprises transmitting at least a portion of the unpriced claim data to one or more external systems each executing at least one pricing model.

17. The computer program product of claim 16, wherein routing at least a portion of the unpriced claim data to at least the first internally executable pricing model comprises routing at least a portion of the unpriced claim data to a pricing model executed by the one or more processors.

18. The computer program product of claim 15, wherein the computer program instructions when executed by a processor, further cause the processor to:
generating one or more claim line records based at least in part on the unpriced claim data, wherein each of the one or more claim line records is for a portion of the unpriced claim data and a discrete element for generating pricing data for the unpriced claim data.

19. The computer program product of claim 18, wherein the one or more claim line records comprise a first claim line record corresponding to a service and a second claim line record corresponding to a product.

20. The computer program product of claim 15, wherein the priority order is determined based at least in part on an identity of each of the selected plurality of pricing models, and wherein at least a portion of pricing data generated by one first pricing model of the plurality of pricing models is utilized as input to a second pricing model of the plurality of pricing models.

21. The computer program product of claim 15, wherein routing at least a portion of the unpriced claim data to each of the selected plurality of pricing models comprises:
   routing at least a portion of the unpriced claim data to a third pricing model in accordance with the priority order;
   determining whether pricing data generated by the third pricing model satisfies pricing criteria; and
   upon determining that the pricing data generated by the third pricing model satisfies the pricing criteria, routing at least a portion of the unpriced claim data to a fourth pricing model in accordance with the priority order.

* * * * *

UNITED STATES PATENT AND TRADEMARK OFFICE
CERTIFICATE OF CORRECTION

PATENT NO. : 11,922,471 B1
APPLICATION NO. : 16/693592
DATED : March 5, 2024
INVENTOR(S) : David G. Cherryhomes et al.

It is certified that error appears in the above-identified patent and that said Letters Patent is hereby corrected as shown below:

In the Claims

In Column 22, Line 20, Claim 1, delete "by one" and insert -- by the one --, therefor.

In Column 22, Line 53, Claim 1, delete "selected plurality of pricing" and insert -- plurality of executable pricing --, therefor.

In Column 22, Line 60, Claim 1, delete "amounts" and insert -- amount --, therefor.

In Column 22, Line 61, Claim 1, delete "selected pricing" and insert -- executable pricing --, therefor.

In Column 22, Line 63, Claim 1, delete "selected pricing" and insert -- executable pricing --, therefor.

In Column 23, Line 34, Claim 6, delete "order is" and insert -- order data set is --, therefor.

In Column 23, Line 35, Claim 6, delete "selected plurality of pricing" and insert -- plurality of executable pricing --, therefor.

In Column 23, Line 38, Claim 6, delete "pricing models" and insert -- executable pricing models --, therefor.

In Column 23, Line 39, Claim 6, delete "pricing" and insert -- executable pricing --, therefor.

In Column 23, Line 42, Claim 7, delete "selected plurality of pricing" and insert -- plurality of executable pricing --, therefor.

In Column 23, Line 45, Claim 7, delete "order;" and insert -- order data set; --, therefor.

In Column 23, Line 51, Claim 7, delete "order." and insert -- order data set. --, therefor.

Signed and Sealed this
Twenty-eighth Day of May, 2024

Katherine Kelly Vidal
*Director of the United States Patent and Trademark Office*

CERTIFICATE OF CORRECTION (continued)
U.S. Pat. No. 11,922,471 B1

In Column 24, Line 24, Claim 8, delete "generate" and insert -- generate first --, therefor.

In Column 24, Line 42, Claim 8, delete "selected plurality of pricing" and insert -- plurality of executable pricing --, therefor.

In Column 24, Line 48, Claim 8, delete "amounts" and insert -- amount --, therefor.

In Column 24, Line 49, Claim 8, delete "selected pricing" and insert -- executable pricing --, therefor.

In Column 24, Line 51, Claim 8, delete "selected pricing" and insert -- executable pricing --, therefor.

In Column 24, Line 63, Claim 9, delete "automated system" and insert -- system --, therefor.

In Column 25, Line 1, Claim 10, delete "automated system" and insert -- system --, therefor.

In Column 25, Line 6, Claim 11, delete "automated system" and insert -- system --, therefor.

In Column 25, Line 13, Claim 12, delete "automated system" and insert -- system --, therefor.

In Column 25, Line 17, Claim 13, delete "automated system" and insert -- system --, therefor.

In Column 25, Line 18, Claim 13, delete "order is" and insert -- order data set is --, therefor.

In Column 25, Line 19, Claim 13, delete "selected plurality of pricing" and insert -- plurality of executable pricing --, therefor.

In Column 25, Line 21, Claim 13, delete "pricing models" and insert -- executable pricing models --, therefor.

In Column 25, Line 22, Claim 13, delete "plurality of pricing" and insert -- plurality of executable pricing --, therefor.

In Column 25, Line 24, Claim 14, delete "automated system" and insert -- system --, therefor.

In Column 25, Line 26, Claim 14, delete "selected plurality of pricing" and insert -- plurality of executable pricing --, therefor.

In Column 25, Line 29, Claim 14, delete "order;" and insert -- order data set; --, therefor.

In Column 25, Line 35, Claim 14, delete "order." and insert -- order data set. --, therefor.

In Column 25, Line 44, Claim 15, delete "one or more claims;" and insert -- at least one claim; --, therefor.

In Column 25, Line 49, Claim 15, delete "one or more processors" and insert -- at least one processor --, therefor.

CERTIFICATE OF CORRECTION (continued)

In Column 26, Line 12, Claim 15, delete "generate" and insert -- generate first --, therefor.

In Column 26, Line 21, Claim 15, delete "the external" and insert -- the first external --, therefor.

In Column 26, Line 28, Claim 15, delete "the memory," and insert -- the non-transitory computer readable medium, --, therefor.

In Column 26, Line 29, Claim 15, delete "selected plurality of pricing" and insert -- plurality of executable pricing --, therefor.

In Column 26, Line 36, Claim 15, delete "amounts" and insert -- amount --, therefor.

In Column 26, Line 37, Claim 15, delete "selected plurality of pricing" and insert -- plurality of executable pricing --, therefor.

In Column 26, Line 39, Claim 15, delete "selected pricing" and insert -- executable pricing --, therefor.

In Column 26, Line 44, Claim 15, delete "the memory," and insert -- the non-transitory computer readable medium, --, therefor.

In Column 26, Line 50, Claim 15, delete "claim." and insert -- claim data. --, therefor.

In Column 26, Line 61, Claim 17, delete "one or more processors." and insert -- at least one processor. --, therefor.

In Column 27, Line 8, Claim 20, delete "order is" and insert -- order data set is --, therefor.

In Column 27, Line 9, Claim 20, delete "selected plurality of pricing" and insert -- plurality of executable pricing --, therefor.

In Column 27, Line 11, Claim 20, delete "pricing models" and insert -- executable pricing models --, therefor.

In Column 27, Line 13, Claim 20, delete "pricing" and insert -- executable pricing --, therefor.

In Column 27, Line 16, Claim 21, delete "selected plurality of pricing" and insert -- plurality of executable pricing --, therefor.

In Column 27, Line 19, Claim 21, delete "order;" and insert -- order data set; --, therefor.

In Column 27, Line 25, Claim 21, delete "order." and insert -- order data set. --, therefor.